United States Patent [19]

Landi et al.

[11] Patent Number: 4,725,650

[45] Date of Patent: Feb. 16, 1988

[54] HEAT STABLE PHENOLIC COMPOSITION CONTAINING ARAMID FIBERS

[75] Inventors: Vincent R. Landi, Danielson; Bruce B. Fitts, Quinebaug, both of Conn.

[73] Assignee: Rogers Corporation, Rogers, Conn.

[21] Appl. No.: 834,197

[22] Filed: Feb. 27, 1986

Related U.S. Application Data

[62] Division of Ser. No. 541,957, Oct. 14, 1982, abandoned.

[51] Int. Cl.$^4$ .................. C08L 9/00; C08L 47/00; C08L 61/04; C08L 61/12

[52] U.S. Cl. ..................... 525/138; 524/35; 524/454; 524/494; 524/496; 524/508; 524/509; 524/511; 525/109; 525/133; 525/139; 525/141

[58] Field of Search .......... 524/35, 454, 494, 496, 524/508, 509, 511; 525/133, 138, 139, 141, 109

[56] References Cited

U.S. PATENT DOCUMENTS

| | | | |
|---|---|---|---|
| 2,659,706 | 11/1953 | Fisk et al. | 525/133 |
| 2,683,697 | 7/1954 | Newell et al. | 525/133 |
| 2,708,192 | 5/1955 | Joesting et al. | 525/133 |
| 3,480,508 | 11/1969 | Roy | 524/511 |
| 3,597,379 | 8/1971 | Valkenburg | 525/133 |
| 3,955,033 | 5/1976 | Elmer | 524/511 |
| 3,959,194 | 5/1976 | Adelmann | 524/511 |
| 3,969,568 | 7/1976 | Sperley | 525/139 |
| 3,991,027 | 11/1976 | Gils et al. | 525/133 |
| 4,026,744 | 5/1977 | Elmer | 525/138 |
| 4,164,485 | 8/1979 | Girgis | 525/133 |
| 4,219,452 | 8/1980 | Littlefield | 523/156 |
| 4,285,756 | 8/1981 | Elmer | 525/133 |
| 4,320,823 | 3/1982 | Covaleski | 525/141 |
| 4,348,491 | 9/1982 | Bertolucci et al. | 524/511 |
| 4,497,915 | 2/1985 | Horoldt et al. | 525/127 |
| 4,569,963 | 2/1986 | Hisaki et al. | 524/511 |

*Primary Examiner*—Herbert J. Lilling
*Attorney, Agent, or Firm*—Fishman & Dionne

[57] ABSTRACT

A phenolic compound having improved retention of useful properties over long periods of time at elevated temperatures is presented. The novel phenolic compound, preferably a glass reinforced phenol-formaldehyde with mineral fillers has incorporated therein elastomers which primarily undergo crosslinking on oxidative aging, such as butadiene based rubbers, and/or molecular sulfur or sulfur donor components. These additives unexpectedly retard thermal degradation with time of aging and provide exceptionally good retention of weight, molded dimensions and mechanical properties.

24 Claims, 3 Drawing Figures

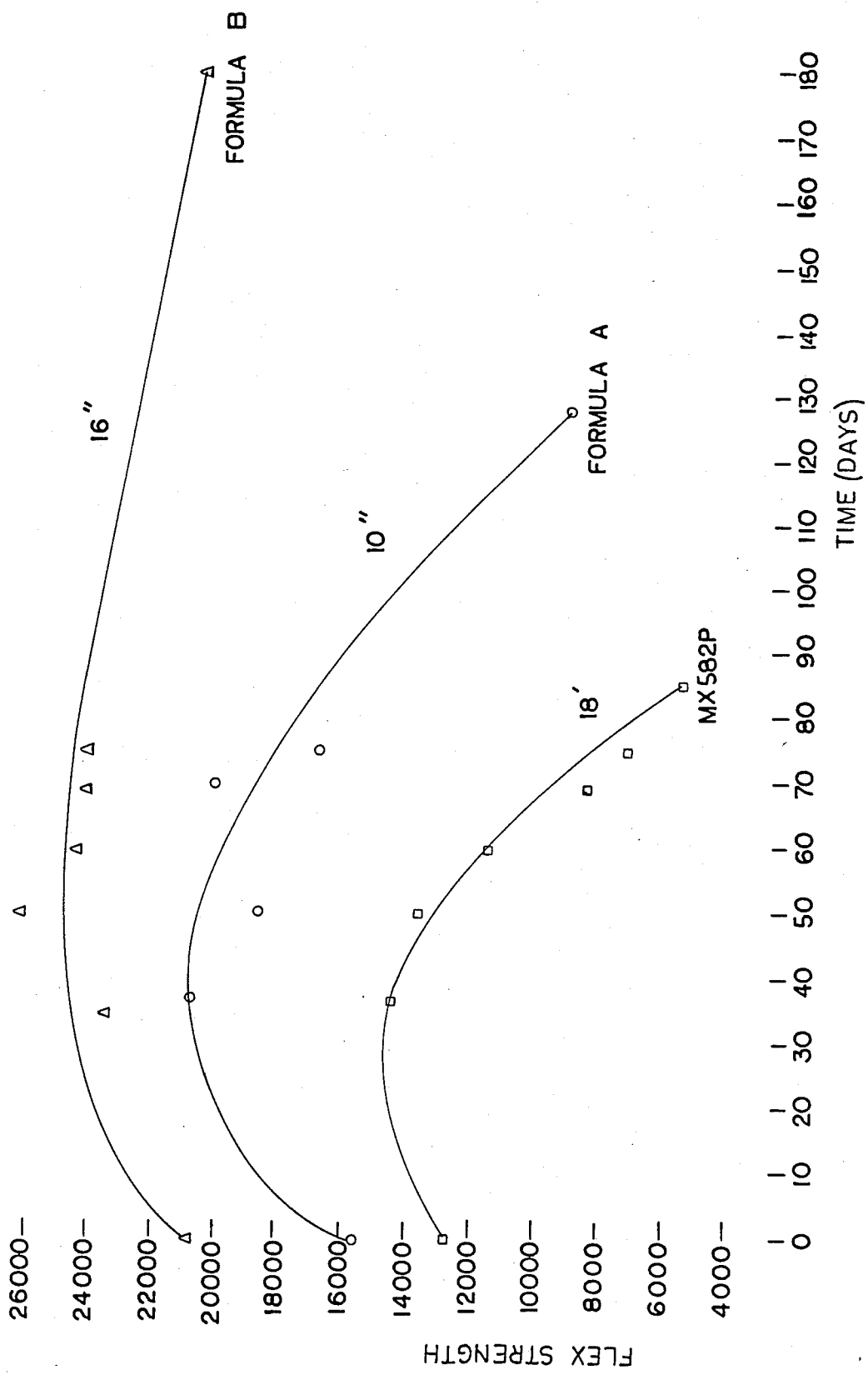

HEAT STABLE PHENOLIC COMPOSITION CONTAINING ARAMID FIBERS
===

This application is a division, of application Ser. No. 541,957, filed Oct. 14, 1982, now abandoned.

BACKGROUND OF THE INVENTION
---

This invention relates to the field of heat stable phenolic resin molding materials. More particularly, this invention relates to the field of thermosetting phenolic resin molding material having superior retention of useful properties during long term exposure at elevated temperatures.

Phenolic, and in particular phenol-formaldehyde polymers reinforced with glass fibers and mineral fillers are well known to those skilled in the art to have excellent dimensional stability, even under high loads and elevated temperatures. In fact, it is commonly known that phenol-formaldehyde compounds withstand thermal degradation at elevated temperatures better than most other common polymeric materials. Nevertheless, greater application and utility of phenolic compositions could be achieved if they were capable of withstanding degradation without appreciable loss of properties with time of aging at even higher temperatures then observed in conventional prior art phenolic molding compounds.

SUMMARY OF THE INVENTION
---

In accordance with the present invention, phenolic resin based molding compositions having improved resistance to degradation at elevated temperatures are achieved by the incorporation therein of either (1) elastomers which embrittle on aging such as butadiene based rubbers and/or (2) molecular sulfur or sulfur donor components.

A preferred phenolic composition of the present invention is comprised of a mixture of phenolic novolac and/or resole resins, glass fiber and/or fibrous reinforcements, particulate mineral fillers and other commonly used additives such as cure accelerators, coupling agents, mold release agents and pigments along with the sulfur compounds and/or butadiene rubber type elastomer heat stabilizing additives. The molding material of the present invention can be processed by any conventional method such as compression, transfer or injection molding.

Surprising and unexpected improvements in the heat aging of glass fiber reinforced phenolic compounds are achieved in the present invention by the incorporation of both sulfur additives and elastomers that primarily undergo crosslinking, that is, embrittle rather than soften on aging. While we have discovered that these two classes of additives when used alone improve the heat aging of phenolic molding compounds, even more surprising is the discovery of a synergistic effect resulting when both butadiene rubbers and sulfur compounds are used in conjunction with each other. Experiments have shown that the combined thermal stabilizing effects more than double the expected linearly cumulative results. Thus, whether alone or synergistically combined, these additive materials have provided the present invention with exceptionally good retention of weight, molded dimensions and mechanical properties even after long exposures at elevated temperatures.

The above-discussed and other advantages of the present invention will be apparent to and understood by those skilled in the art from the following detailed description and accompanying examples and drawings.

BRIEF DESCRIPTION OF THE DRAWINGS
---

FIG. 3 is a plot of flex strength versus time for several formulations, one of which is in accordance with the present invention.

Figure 1:
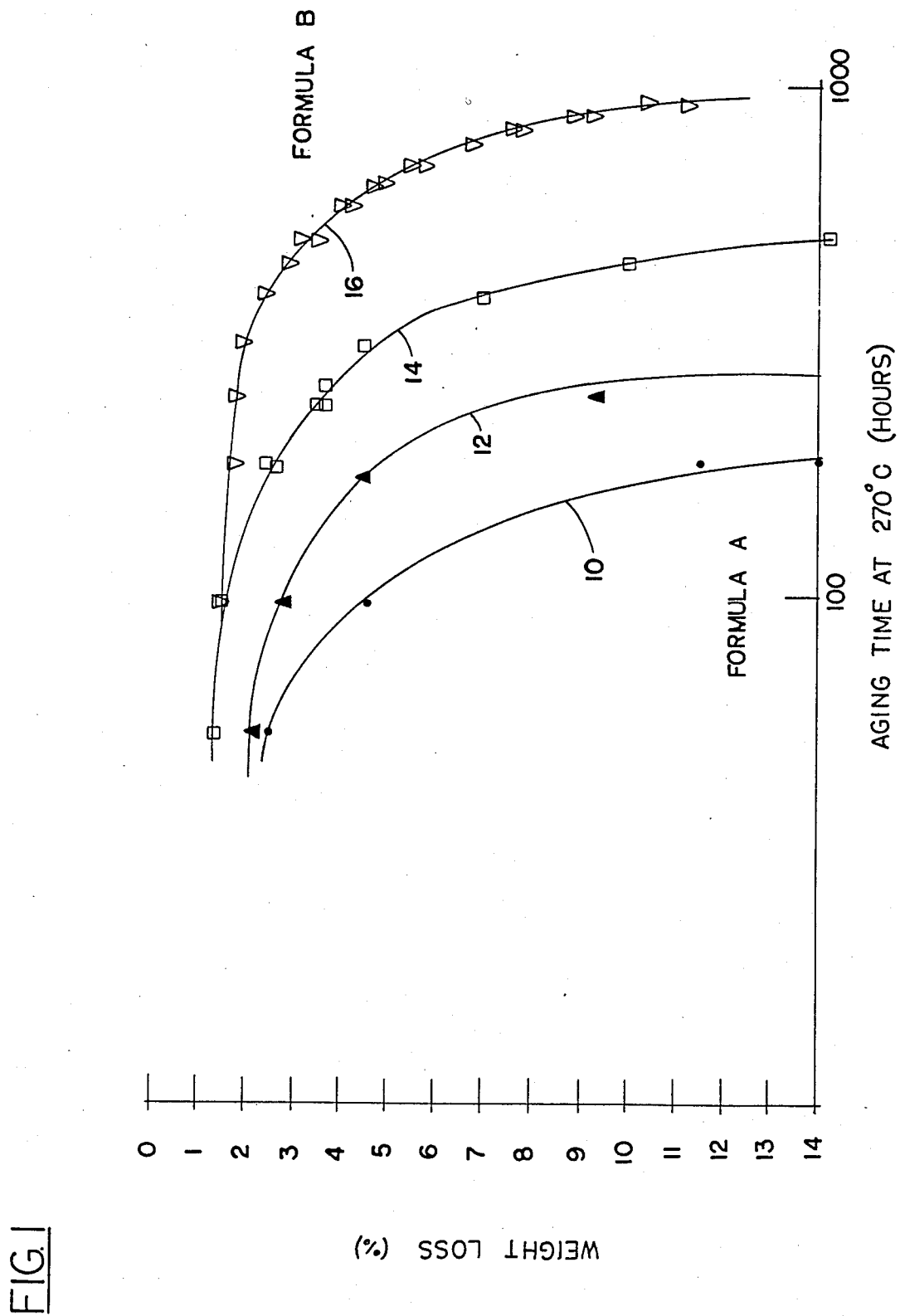
FIG. 1 shows a logarithmic plot of percent weight loss vs. aging time at 270° C. for several formulations some of which are in accordance with the present invention.

DESCRIPTION OF THE PREFERRED EMBODIMENT
---

In accordance with the present invention, phenolic resin based molding compositions having improved thermal resistance are achieved through the incorporation therein of either (1) elastomers which embrittle on aging such as butadiene based rubbers and/or (2) molecular sulfur or sulfur donor components. The improved phenolic compositions are preferably comprised of a mixture of the following:

1. One or more heat curable or thermosetting phenolic novolac and/or resole resins.
2. Glass fiber and/or other fibrous reinforcements.
3. One or a combination of particulate mineral fillers.
4. Other additives commonly employed in phenolic molding compositions, such as cure accelerators, coupling agents, mold release agents and pigments.
5. Elastomers which embrittle on aging, such as butadiene rubbers, and/or molecular sulfur or sulfur donor components.

Phenolic molding compounds comprised of the components in 1–4 above are readily commercially available and well known to those skilled in the art.

The phenolic resins useful for the present invention are also well known to those skilled in the art. These resins are comprised of a number of different phenols which are combined with an aldehyde. The phenol monomers which are used include substituted phenols such as, but not limited to, resorcinol, para-t-butylphenol, para-phenylphenol, cresols, xylenols, and other alkylated phenols. Numerous aldehydes can also be employed such as, but not limited to, formaldehyde, paraformaldehyde, acetaldehyde, butyraldehyde and furfuraldehyde. These resins are capable of being cured with heat and/or hardeners to yield a cross-linked structure. Novolacs and resoles are the two basic types of phenolic resins and can be differentiated by the catalyst used in the preparation, the formaldehyde to phenol ratio and reactivity. A molar ratio of aldehyde to phenol of less than one is commonly referred to as a novolac. Hardeners such as, but not limited to, hexamethylenetetramine (hexa) are required to cross-link novolacs. Resoles are produced with a molar ratio of aldehyde to phenol of greater than one, and contain reactive groups that require only heat to effect cross-linking.

The phenolic resins based on phenol and formaldehyde are preferable and are readily commercially available. Other preferable resin components include one or a combination of a number of novolac and/or resole resins. For example, it is often desirable to mix novolacs of different molecular weights to adjust the molding rheology or cure rate. The amount of resin employed can vary from about 15 to 40% by weight (25 to 55% by volume) of the total composition depending upon the ultimate properties desired. In compositions containing novolac resins, it is preferable to minimize the hexa content consistent with achieving adequate cross-linking in the finished moldings. An excessive amount of hexa will adversely affect heat resistance. The minimization of hexa content can often be facilitated by its partial substitution with other formaldehyde donor compounds such as anhydroformaldehyde aniline, resole, melamine/formaldehyde and epoxide resins.

The compositions of the present invention will generally contain between 10 to 40% by weight (8 to 30% by volume) fibrous reinforcement. A preferred reinforcement is glass fiber which has either been milled or is in chopped-strand form. Other fibers include, but are not limited to, aramid, asbestos, carbon, cellulose, ceramic, and any combination of these or other fibers employed in commercial phenolic molding compositions.

The presence of ionic contaminants and/or surface reactivity are important considerations in the selection of suitable fillers. Fillers which are mildly acidic have been found to produce better heat resistance. Useful fillers include particulate minerals such as silica, calcium silicate (Wollastonite), hydrated clays, powdered glass, glass beads, and mixtures thereof. Hydrated clay is a preferred filler because particularly good heat aging results have been obtained in compositions containing clay. The filler or combination of fillers can be used in amounts ranging from about 5 to 50% by weight of the total composition.

The addition of certain coupling agents appears to be beneficial in the present invention to the heat resistance of glass reinforced phenolic compounds. Preferred coupling agents include: gamma-aminopropyltriethoxysilane, n-beta-(aminoethyl) gamma-aminopropyltrimethoxysilane, beta-(3,4-epoxy cyclohexyl) ethyltrimethoxysilane, gamma-glycidoxypropyltrimethoxysilane, gamma-mercaptopropyltrimethoxysilane, and ureido-modified amino coupling agent.

Usually, the compounds of the present invention will also contain cure accelerators. For example, metal oxides such as lime, magnesium oxide, zinc oxide and mixtures thereof are frequently added to accelerate the curing reactions. The compositions will generally contain from about 0.5 to 5.0% by weight of the accelerators. Selection of the specific accelerator is very important. Both lime and zinc oxide have been found to be detrimental to heat resistance in comparison to magnesium oxide.

The compositions of the present invention also contain various release agents and pigments. The release agent may be any additive commonly used in phenolic compounds for this purpose. Examples are calcium stearate, zinc stearate, stearic acid, and various combinations thereof. The release agent is usually used in amounts ranging from 0.5 to 3.0% by weight, although higher levels may be employed.

The elastomer component which embrittles on aging, such as the butadiene rubber, in the present invention can be any one of a multitude of polymers which are commercially available. Latex and powdered forms are most convenient for optimum dispersion in the molding compounds. Examples of materials that have benefited heat resistance in accordance with the present invention include:
  Acrylonitrile/butadiene copolymer latex
  Powdered acrylonitrile/butadiene copolymer (pre-cross-linked)
  Butadiene/styrene/vinyl pyridine terpolymer latex
  Butadiene/styrene copolymer latex
  Carboxyterminated butadiene/styrene copolymer latex Particularly good results are obtained in the present invention from compositions containing from about 3.0 to 8.0% by weight (5 to 13% by volume) of the rubber; although at this point there is no data as to the outer limits of the rubber content. It is known that the addition of rubber will impair mechanical and electrical properties, water absorption rate, surface hardness and moldability of the phenolic composition. The fact that increased rubber content results in impaired properties suggests that the rubber should be added only in effective amounts, that is, amounts which will contribute to improved heat aging characteristics without adversely affecting mechanical electrical, molding and water absorbing properties.

Similarly, at this point, the effective amount of sulfur based additives have been found to be from about 0.19% up to about 1.6%, by weight (from about 0.24 up to about 2.0% by volume) although outer limits to the sulfur weight percent are yet to be determined. As noted, both molecular sulfur and sulfur donor compounds have improved the heat aging of phenolic molding compositions. Preferable sulfur donor components include tetramethylthiuram disulfide (TMTD), 2, 2' dithiobisbenzothiazole (MBTS), and possibly morpholine disulfide (Sulfasan R), tetramethylthiuram monosulfide (Unads), dipentamethylenethiuram hexasulfide (Tetrone A).

The molding compounds obtained in accordance with the present invention can be processed by any of the conventional methods such as compression, transfer and injection molding under conditions similar to those for other commercial phenolic materials. Distinguishing features of the resulting molded articles include excellent weight, dimensional and mechanical properties retention on aging at high temperatures. Those compositions containing relatively large proportions of rubber also exhibit interesting drop weight impact resistance (toughness) and modulus properties.

The incorporation of nitrile rubber in phenolics for improved toughness is well known by those skilled in the art. However, the superior heat resistance achieved in the present invention by the butadiene based compounds in comparison to other commercially available rubber filled phenolic materials is unexpected.

The following examples and drawings are provided to illustrate further the scope of the present invention; however, they should not be construed to be limitations thereof. Unless otherwise specified, where parts or percentages are given, they are by weight.

EXAMPLES

Example 1

Four formulations were prepared for this example, (A) being a control and three (B, C, D) being in accordance with the present invention. The control formulation (A) contained neither rubber nor sulfur additives. The (B) formulation contained an acylonitrile/butadiene latex and molecular sulfur.

The rubber latex contained about 40% by weight of an uncrosslinked, 45% bound acrylonitrile content rubber. Composition (C) contained the rubber latex but no sulfur. The fourth formulation (D) was produced with a powdered rubber instead of latex. The powdered rubber was a cross-linked acrylonitrile/butadiene copolymer with about 40% bound acrylonitrile. The respective formulations are detailed as follows:

|  | FORMULA | | | |
|---|---|---|---|---|
|  | A CONTROL | B | C | D |
| Glass Fibers (⅛ inch) | 35.65 | 35.58 | 35.64 | 35.61 |
| Silane | 1.27 | 1.27 | 1.27 | 1.27 |
| Ethanol | (0.85) | (0.85) | (0.85) | (0.85) |
| Acrylonitrile/Butadiene latex | 0 | 6.35 | 6.37 | 0 |
| Powdered Acrylonitrile/Butadiene copolymer | 0 | 0 | 0 | 6.35 |
| Stearic Acid | 0.42 | 0.42 | 0.42 | 0.42 |
| Calcium Stearate | 0.49 | 0.49 | 0.49 | 0.49 |
| Magnesium Oxide | 1.16 | 1.17 | 1.16 | 1.16 |
| Sulfur | 0 | 0.19 | 0 | 0.19 |
| Clay | 29.18 | 29.12 | 29.17 | 29.14 |
| Phenolic Novolac with Hexa curing agent | 31.55 | 25.14 | 26.02 | 25.10 |
| Lime | 0.27 | 0.27 | 0.27 | 0.27 |
| Water | (10.61) | (10.59) | (10.61) | (10.60) |
| TOTALS (DRY) | 99.99 | 100.00 | 100.00 | 100.00 |

The glass fiber was initially pretreated with a mixture of the silane and ethanol. This was accomplished by pouring increments of the liquids onto the glass in a polyethylene bag, and then agitating the bag until the glass appeared uniformly wet. The formulation constituents were initially dry blended in a Baker Perkins sigma mixer. Next, the latex was charged to the sigma mixer and was blended with the other constituents, including the pretreated glass. Total blending time in the sigma mixer was about 20 minutes.

The mixture was subsequently compounded in a single screw extruder equipped with a die plate with ⅜ inch diameter orifices. Water was fed to the extruder along with preblended composition as a processing aid. The extrudate was cooled to room temperature, and then ground through a ⅜ inch screen to produce a granular form of molding material. The alcohol and moisture were removed by drying. A final volatile matter content of about 4.0% as judged by the weight loss accompanying a 20 minute exposure to 160° C. proved about optimum. Test specimen bars 5×½×⅛ inches were then formed by transfer molding of the granular material.

The specimens were postbaked for 6 hours at 177° C. plus four hours at 188° prior to the aging test. This post-mold baking operation serves to at least partially recover the loss in flexural strength and hardness caused by the incorporation of the rubber.

The heat aging tests were conducted as follows:

Bars of ½×⅛×5 inch nominal dimensions were produced by transfer molding. The materials were preformed, RF preheated to about 240° F. (116° C.) and molded in an end-gated cavity. The transfer pressure was varied depending on the plasticity of the molding compound. The nominal mold temperature was 335° F. (168° C.), and cure time was two minutes.

The bar specimens were afterbaked prior to the oven aging studies. A stepbake cycle of six hours at 350° F. (177° C.) plus four hours at 375° F. (191° C.) was used throughout the work. The bars were cooled to room temperature subsequent to the afterbake, were weighed, and were then placed in the oven stabilized at 270° C. Several afterbaked specimens were tested at room temperature for flexural strength in accordance with ASTM D790-81, Method I, Procedure A, to establish the initial (unaged) strength. Specimens were periodically sampled from the aging oven to measure weight and flexural strength change. The time to both 10% weight loss and to 50% flexural strength loss were then estimated by graphical interpolation of the data.

The results are summarized as follows:

| Properties | A | B | C | D |
|---|---|---|---|---|
| Volatile Matter, (%) | 4.0 | 4.1 | 4.3 | 3.9 |
| Flexural Strength Baked, (psi) | 21,200 | 20,600 | 19,900 | 20,000 |
| Flexural Modulus Baked, (10⁶ psi) | 3.01 | 2.18 | 2.18 | 2.35 |
| Time to 10% Weight Loss at 270° C., (hours) | 155 | 785 | 390 | 795 |
| Time to 50% Flex Strength Loss at 270° C., (hours) | 130 | 770 | 330 | 810 |

The results demonstrate the dramatic improvement in both weight and flex strength retention accomplished by the present invention. The rubber and sulfur containing materials (B and D) exhibited about a six-fold improvement over the unmodified control (A) in flexural strength retention at 270° C. Additionally, precrosslinked powdered rubber (D) and uncured latex (B) appear to work equally well. Finally, the composition with rubber but without sulfur (C) shows the beneficial effect (although not as great) of this variable. Note that flexural strength and flexural modulus data given in all the tables are initial values taken on the test bars before aging at 270° C.

Example 2

Compounds E, F and G were made with sulfur alone, powdered rubber alone, and powdered rubber plus double the previous sulfur level. These compounds had the same general formula as B, but with sulfur and rubber being varied as indicated, and the phenolic content adjusted, as required in each case depending on the amount of sulfur and rubber, to total 100 parts. The materials were prepared and tested as in Example 1. The results are presented below.

|  | Formula | | |
|---|---|---|---|
|  | E | F | G |
| Powdered Acrylonitrile/Butadiene copolymer | 0(%) | 6.37 | 6.34 |
| Sulfur | 0.19 | 0 | 0.38 |
| Other | | | |
| Glass Fibers (⅛ inch) | 35.58 | 35.65 | 35.51 |
| Silane | 1.27 | 1.27 | 1.27 |
| Ethanol | (0.85) | (0.85) | (0.85) |
| Stearic Acid | 0.42 | 0.42 | 0.42 |
| Calcium Stearate | 0.49 | 0.49 | 0.49 |
| Magnesium Oxide | 1.17 | 1.17 | 1.17 |
| Clay | 29.12 | 29.18 | 29.06 |
| Phenolic Novolac with Hexa curing agent | 31.49 | 25.19 | 25.09 |
| Lime | 0.27 | 0.27 | 0.27 |
| Water | (10.59) | (10.61) | (10.57) |
| TOTALS (DRY) | 100.00 | 100.01 | 100.00 |

The results are summarized as follows:

| Properties | | | |
|---|---|---|---|
| Volatile Matter, (%) | 4.4 | 4.4 | 4.0 |
| Flexural Strength - baked, (psi) | 22,000 | 17,300 | 18,600 |

-continued

| Properties | | | |
|---|---|---|---|
| Flexural Modulus - baked, ($10^6$ psi) | 3.03 | 2.28 | 2.34 |
| Time to 10% Weight Loss at 270° C., (hours) | 235 | 410 | 875 |
| Time to 50% Flex Loss at 270° C., (hours) | 235 | 390 | 840 |

The results show that the addition of either rubber or sulfur alone cause significant improvements in heat aging, and that with both the rubber and sulfur still greater improvement is obtained. This is an important advantage in that improved aging life is possible with essentially no change in the other properties of the compound by the addition of small amounts of sulfur alone. The use of 0.38% sulfur (compound G) as opposed to 0.19% sulfur (compound B or D) in conjunction with 6.3% rubber resulted in only a slight increase in aging life from 785 or 795 hours to 875 hours.

A study of the results of the compounds of this example and those of Example 1 also reveals the unexpected synergistic effect of combining butadiene rubber with a sulfur compound. One would expect that the time to 10% weight loss at 270° C. when E and F are combined would be additive, i.e., 235 +410=645 hours. Instead, the surprising synergistic result is 785 hours for the B formulation, 795 hours for the D formulation and 875 hours for the G formulation. A further discussion of this synergistic effect appears hereinafter.

Example 3

This example illustrates the performance of material compounded on a two roll mill instead of by extrusion. Compound H of this example has the same general formula as B, but with sulfur and rubber being varied as indicated, and the phenolic content adjusted, as required in each case depending on the amount of sulfur and rubber, to total 100 parts. The glass fiber was coated with the silane as described in Example 1. The total composition was subsequently dry blended using a Patterson-Kelley twin shell blender. Then, 800 gram increments of the resulting premix were roll mill compounded. The roll temperatures were 110° and 65° C., and the roll time was 60 seconds. The product was removed from the mill, allowed to cool to room temperature, and then ground through a ⅜ inch screen. The compound was molded into test specimens and was tested by the same procedures as Example 1.

| | Formula H (Roll Mill Compounded) |
|---|---|
| Powdered Acrylonitrile/Butadiene copolymer | 6.35 |
| Sulfur | 0.19 |
| Other | |
| Glass Fibers (⅛ inch) | 35.58 |
| Silane | 1.27 |
| Ethanol | (3.00) |
| Stearic Acid | 0.42 |
| Calcium Stearate | 0.49 |
| Magnesium Oxide | 1.17 |
| Clay | 29.12 |
| Phenolic Novolac with Hexa curing agent | 25.14 |
| Lime | 0.27 |
| Water | (0.00) |
| TOTALS (DRY) | 100.00 |

The results are summarized as follows:

| Properties | |
|---|---|
| Volatile Matter, (%) | 3.2 |
| Flexural Strength - baked, (psi) | 22,700 |
| Flexural Modulus - baked, ($10^6$ psi) | 2.36 |
| Time to 10% Weight Loss at 270° C., (hours) | 630 |
| Time to 50% Flex Strength Loss at 270° C., (hours) | 660 |

Reasonably good heat aging results were obtained, although not quite as good as its extruded counterpart (Compound B). The results show that the beneficial effects of the formulation modifications are not restricted to the extrusion compounding process.

Example 4

Composition I was formed the same as formulation C, with the exception that a caboxylated acrylic rubber latex was substituted for the acrylonitrile/butadiene rubber latex in formulation C. The acrylic latex contained about 50% solids by weight.

Test specimens were formed and tested as in Example 1.

The results were as follows:

| | Formula I |
|---|---|
| Carboxylated Acrylic Solids | 6.37 (%) |
| Sulfur | 0 |
| Other | |
| Glass Fibers (⅛ inch) | 35.65 |
| Silane | 1.27 |
| Ethanol | (0.85) |
| Stearic Acid | 0.42 |
| Calcium Stearate | 0.49 |
| Magnesium Oxide | 1.17 |
| Clay | 29.17 |
| Phenolic Novolac with Hexa curing agent | 25.19 |
| Lime | 0.27 |
| Water | (10.61) |
| TOTALS (DRY) | 100.00 |

The results are summarized as follows:

| Properties | |
|---|---|
| Volatile Matter, (%) | 4.3 |
| Flexural Strength - baked, (psi) | 14,700 |
| Flexural Modulus - baked, ($10^6$ psi) | 2.19 |
| Time to 10% Weight Loss at 270° C., (hours) | 180 |
| Time to 50% Flex Strength Loss at 270° C., (hours) | 165 |

The acrylate rubber was tested because acrylate rubbers generally have better aging resistance than acrylonitrile/butadiene rubber when evaluated alone. The heat aging of the phenolic compound containing acrylate rubber was poor, demonstrating the unexpected nature of the benefit derived from acrylonitrile/butadiene rubber. This is a surprising result since the prior art teaches the use of an acrylate rubber in heat stabilizing applications rather than an acrylonitrile-/butadiene rubber.

Example 5

Vinyl pyridine/butadiene/styrene and carboxylated styrene/butadiene latexes were evaluated in formulations J and K in lieu of the nitrile latex. These compounds had the same general formula as B, but with sulfur and rubber being varied as indicated, and the phenolic content adjusted, as required in each case depending on the amount of sulfur and rubber, to total 100 parts.

Test specimens were made and tested as in Example 1.

The results are summarized as follows:

|  | Formula | |
|---|---|---|
|  | J | K |
| Vinyl/Pyridine/Butadiene/Styrene Solids | 6.35 | 0 |
| Carboxylated Styrene/Butadiene Solids | 0 | 6.35 |
| Sulfur | 0.19 | 0.19 |
| Other |  |  |
| Glass Fibers (⅛ inch) | 35.58 | 35.58 |
| Silane | 1.27 | 1.27 |
| Ethanol | (0.85) | (0.85) |
| Stearic Acid | 0.42 | 0.42 |
| Calcium Stearate | 0.49 | 0.49 |
| Magnesium Oxide | 1.17 | 1.17 |
| Clay | 29.12 | 29.12 |
| Phenolic Novolac with Hexa curing agent | 25.14 | 25.14 |
| Lime | 0.27 | 0.27 |
| Water | (10.59) | (10.59) |
| TOTALS (DRY) | 100.00 | 100.00 |

The results are summarized as follows:

| Properties |  |  |
|---|---|---|
| Volatile Matter, (%) | 4.1 | 4.3 |
| Flexural Strength - baked, (psi) | 12,800 | 14,900 |
| Flexural Modulus - baked, ($10^6$ psi) | 1.96 | 2.12 |
| Time to 10% Weight Loss at 270° C., (hours) | 550 | 680 |
| Time to 50% Flex Strength Loss at 270° C., (hours) | 580 | 650 |

This example shows that other butadiene containing rubbers used in accordance with the present invention cause improvements in aging life.

Example 6

In this example, formulations L, M, N and O were prepared with phenolic resin type (novolac versus resole), hexa level, and the use of zinc oxide as a cure accelerator being variables. Test specimens were made and tested as in Example 1. A summary of the experiments follows.

|  | Formula | | | |
|---|---|---|---|---|
|  | L | M | N | O |
| Phenolic Novolac | 21.08 | 0 | 20.95 | 22.24 |
| Phenolic Resole | 0 | 25.41 | 0 | 0 |
| Hexa Level | 4.08 | 0 | 4.05 | 2.85 |
| Magnesium Oxide | 1.16 | 1.16 | 0 | 1.16 |
| Zinc Oxide | 0 | 0 | 1.77 | 0 |
| Powdered Acrylonitrile/Butadiene copolymer | 6.35 | 6.35 | 6.31 | 6.35 |
| Sulfur | 0.19 | 0.19 | 0.19 | 0.19 |
| Other |  |  |  |  |
| Glass Fibers (⅛ inch) | 35.55 | 35.58 | 35.33 | 35.58 |
| Silane | 1.27 | 1.27 | 1.26 | 1.27 |
| Ethanol | (0.85) | (0.85) | (0.84) | (0.85) |
| Stearic Acid | 0.42 | 0.42 | 0.42 | 0.42 |
| Calcium Stearate | 0.49 | 0.49 | 0.48 | 0.49 |
| Clay | 29.09 | 29.12 | 28.92 | 29.12 |
| Lime | 0.32 | 0 | 0.32 | 0.32 |
| Water | (10.58) | (10.59) | (10.52) | (10.59) |
| TOTALS (DRY) | 100.00 | 99.99 | 100.00 | 99.99 |

The results are summarized as follows:

| Properties |  |  |  |  |
|---|---|---|---|---|
| Volatile Matter, (%) | 5.4 | 3.6 | 3.6 | 3.8 |
| Flexural Strength Baked, (psi) | 18,900 | 23,200 | 24,800 | 22,000 |
| Flexural Modulus Baked, ($10^6$ psi) | 2.34 | 2.44 | 2.45 | 2.32 |
| Time to 10% Weight Loss at 270° C., (hours) | 635 | 775 | 470 | 750 |
| Time to 50% Flex Strength Loss at 270° C., (hours) | 620 | 720 | 390 | 710 |

It appears that the excellent aging characteristics of the present invention can be achieved with phenolic resole based compounds as well. The use of zinc oxide as a cure accelerator was found to impar heat resistance in comparison to an equal volume of magnesium oxide. Additionally, an improvement in heat resistance resulting from reduced hexa level was demonstrated. Samples L, D and P were equivalent in both rubber and sulfur level. However, L had a higher moisture content than either D or P (5.4% versus 3.9% and 3.8% volatile material respectively). Early experiments have shown that higher moisture levels leads to more rapid aging of phenolics.

Example 7

In this Example, formula P and Q were compounded to explore the effects of the use of a sulfur donor compound, tetramethylthiuram disulfide (TMTD), in lieu of molecular sulfur. The materials were compounded and tested as described previously for Example 1. Note that because of a mold breakdown, the P and Q examples were compression molded. The preheated preforms were end-loaded into the mold cavity in an attempt to simulate transfer molding. Similar temperatures were used. The molding pressure was 2500 psi (fully positive mold), and cure time was three minutes. Preliminary findings reveal that compression molded specimens give poorer aging results than transfer molded specimens.

The formulations were as follows:

|  | Formula | |
|---|---|---|
|  | P | Q |
| Powdered Acrylonitrile/Butadiene copolymer | 6.35 | 6.34 |
| Sulfur | 0.19 | 0 |
| Sulfur as TMTD | 0 | (0.19) |
| TMTD | 0 | 0.38 |
| Other |  |  |
| Glass Fibers (⅛ inch) | 35.58 | 35.51 |
| Silane | 1.27 | 1.27 |
| Ethanol | (0.85) | (0.85) |
| Stearic Acid | 0.42 | 0.42 |
| Calcium Stearate | 0.49 | 0.49 |
| Magnesium Oxide | 1.16 | 1.16 |
| Clay | 29.12 | 29.06 |

-continued

|  | Formula | |
|---|---|---|
|  | P | Q |
| Phenolic Novolac with Hexa curing agent | 25.09 | 25.04 |
| Lime | 0.32 | 0.32 |
| Water | (10.59) | (10.57) |
| TOTALS (DRY) | 99.99 | 99.99 |

The results are summarized as follows:

| Properties | | |
|---|---|---|
| Volatile Matter, (%) | 3.8 | 4.0 |
| Flexural Strength - baked, (psi) | 18,500 | 18,700 |
| Flexural Modulus - baked, ($10^6$ psi) | 2.19 | 2.18 |
| Time to 10% Weight Loss at 270° C., (hours) | 510 | 545 |
| Time to 50% Flex Strength Loss at 270° C., (hours) | 530 | 565 |

This example demonstrates that sulfur donor compounds can be at least as effective as molecular sulfur relative to improvement of aging life. An advantage of the donor over molecular sulfur is the presence of less hydrogen sulfide odor during the molding of the phenolic compound.

Example 8

In this Example, formulas R and S were compounded to explore the effects of the use of Wollastonite filler as a substitute for clay on an equal volume basis. Sulfur was incorporated as TMTD. The materials were compounded and tested as described for Example 1.

The formulations were as follows:

|  | Formula | |
|---|---|---|
|  | R | S |
| Powdered Acrylonitrile/Butadiene copolymer | 6.34 | 6.11 |
| Sulfur as TMTD | (0.19) | (0.19) |
| Clay | 29.06 | 0 |
| Wollastonite | 0 | 31.53 |
| TMTD | 0.38 | 0.37 |
| Other |  |  |
| Glass Fibers (⅛ inch) | 35.49 | 34.26 |
| Silane | 1.27 | 1.22 |
| Ethanol | (0.84) | (0.82) |
| Stearic Acid | 0.42 | 0.41 |
| Calcium Stearate | 0.51 | 0.49 |
| Magnesium Oxide | 1.18 | 1.14 |
| Phenolic Novolac with Hexa curing agent | 25.01 | 24.14 |
| Lime | 0.34 | 0.33 |
| Water | (10.56) | (10.20) |
| TOTALS (DRY) | 100.00 | 100.00 |

The results are summarized as follows:

| Properties | | |
|---|---|---|
| Volatile Matter, (%) | 3.9 | 3.6 |
| Flexural Strength - baked, (psi) | 17,000 | 21,900 |
| Flexural Modulus - baked, ($10^6$ psi) | 2.06 | 2.13 |
| Time to 10% Weight Loss at 270° C., (hours) | 620 | 460 |
| Time to 50% Flex Strength Loss at 270° C., (hours) | 615 | 390 |

The data illustrate that the selection of suitable fillers is important in order to optimize heat aging. The Wollastonite filled compound exhibited significantly poorer heat aging performance than the hydrated clay filled material. But note that this formulation did display better heat aging than Wollastonite filler without any rubber or sulfur additive. Thus, example 8 indicates that the poor heat aging characteristics of the particular filler may counteract some of the beneficial effects of the rubber and/or sulfur components.

Example 9

Formulas T–X were compounded to explore the effect of using varying amounts of powdered nitrile rubber, sulfur, and novolac resin. Specimens were made and tested as in Example 1. The resultant compounds were evaluated for molding characteristics as judged by orifice flow tests, and were subjected to thermal aging tests at 270° C. A summary of the major formulation changes and the corresponding test results is presented below.

|  | Formula | | | | |
|---|---|---|---|---|---|
|  | T | U | V | W | X |
| Powdered Acrylonitrile/Butadiene copolymer | 5.07 | 3.80 | 5.05 | 3.79 | 7.56 |
| Sulfur as TMTD | (0.19) | (0.19) | (0.38) | (0.38) | (0.20) |
| TMTD | 0.38 | 0.38 | 0.76 | 0.76 | 0.40 |
| Other |  |  |  |  |  |
| Glass Fibers (⅛ inch) | 35.49 | 35.49 | 35.35 | 35.35 | 37.37 |
| Silane | 1.27 | 1.27 | 1.26 | 1.26 | 1.34 |
| Ethanol | (0.85) | (0.85) | (0.84) | (0.84) | (0.89) |
| Stearic Acid | 0.42 | 0.42 | 0.42 | 0.42 | 0.45 |
| Calcium Stearate | 0.51 | 0.51 | 0.51 | 0.51 | 0.53 |
| Magnesium Oxide | 1.18 | 1.18 | 1.18 | 1.18 | 1.25 |
| Clay | 29.07 | 29.07 | 28.96 | 28.96 | 20.51 |
| Phenolic Novolac with Hexa curing agent | 26.28 | 27.55 | 26.18 | 27.44 | 30.25 |
| Lime | 0.34 | 0.34 | 0.34 | 0.34 | 0.36 |
| Water | (10.56) | (10.56) | (10.52) | (10.52) | (11.12) |
| TOTALS (DRY) | 100.01 | 100.01 | 100.01 | 100.01 | 100.02 |

The results are summarized as follows:

| Properties | | | | | |
|---|---|---|---|---|---|
| Volatile Matter, (%) | 3.7 | 4.0 | 4.4 | 4.1 | 4.5 |
| Orifice Flow/1800 psi, (%) | 69 | 75 | 68 | 75 | 78 |
| Flexural Strength Baked, (psi) | 19,800 | 23,400 | 19,600 | 22,500 | 21,500 |
| Flexural Modulus Baked, ($10^6$ psi) | 2.25 | 2.44 | 2.18 | 2.43 | 1.83 |
| Time to 10% Weight Loss at 270° C., (hours) | 610 | 520 | 630 | 610 | 480 |
| Time to 50% Flex Strength Loss at 270° C., (hours) | 635 | 480 | 650 | 590 | 510 |

The above data demonstrate that the molding characteristics can be adjusted by changes in resin content. As expected, higher resin leads to higher orifice flow, therefore a softer molding compound. The effect of Acrylonitrile/Butadiene copolymer rubber substitution level on aging life is also demonstrated. Lower rubber gave poorer aging life. Also, raising the sulfur from 0.2 to 0.4% provided additional benefits in heat aging, particularly at the lower rubber level. Hence, a spectrum of performance characteristics is possible by varying the proportions of the aforementioned constituents.

While the foregoing Examples 1–9 have been set forth in terms of weight percentages of the various components, the following is a recapitulation of Examples 1-9 wherein the components have been set forth in terms of volumes percentages. It will be appreciated that the weight percentages of the various components have been converted to volume percentages using simple and well known mathematical calculations.

Example 1 (Volume Percent)

| | Formula: | | | |
|---|---|---|---|---|
| | A Control | B | C | D |
| | (percent by volume) | | | |
| Glass Fibers (⅛ inch) | 26.70 | 25.91 | 25.85 | 25.91 |
| Silane | 2.57 | 2.50 | 2.49 | 2.50 |
| Ethanol | n/a* | n/a | n/a | n/a |
| Acrylonitrile/Butadiene Latex (solids) | 0 | 11.86 | 11.84 | 0 |
| Powdered Acrylonitrile/Butadiene Copolymer | 0 | 0 | 0 | 11.41 |
| Stearic Acid | 0.93 | 0.91 | 0.90 | 0.91 |
| Calcium Stearate | 0.89 | 0.87 | 0.87 | 0.87 |
| Magnesium Oxide | 0.63 | 0.61 | 0.61 | 0.61 |
| Sulfur | 0 | 0.19 | 0 | 0.19 |
| Clay | 21.51 | 20.88 | 20.83 | 20.88 |
| Phenolic Novolac plus Hexamethylene tetramine | 46.59 | 36.10 | 36.45 | 36.55 |
| Lime | 0.19 | 0.19 | 0.18 | 0.18 |
| Water | n/a | n/a | n/a | n/a |
| Totals (dry) | 100.01 | 100.01 | 100.02 | 100.01 |

*n/a - not applicable; not present in finished product

Example 2 (Volume Percent)

| | Formula: | | |
|---|---|---|---|
| | E | F | G |
| | (percent by volume) | | |
| Powdered Acrylonitrile/Butadiene Copolymer | 0 | 11.45 | 11.40 |
| Sulfur | 0.19 | 0 | 0.35 |
| Other | | | |
| Glass Fibers (⅛ inch) | 26.50 | 25.97 | 25.87 |
| Silane | 2.55 | 2.50 | 2.50 |
| Ethanol | n/a | n/a | n/a |
| Stearic Acid | 0.93 | 0.91 | 0.91 |
| Calcium Stearate | 0.89 | 0.87 | 0.87 |
| Magnesium Oxide | 0.62 | 0.61 | 0.61 |
| Clay | 21.36 | 20.92 | 20.84 |
| Phenolic Novolac plus Hexamethylene tetramine | 46.78 | 36.61 | 36.48 |
| Lime | 0.18 | 0.18 | 0.18 |
| Water | n/a | n/a | n/a |
| Totals (dry) | 100.00 | 100.02 | 100.01 |

Example 3 (Volume Percent)

| | Formula: H (Roll Mill Compounded) (percent by volume) |
|---|---|
| Powdered Acrylonitrile/Butadiene Copolymer | 11.41 |
| Sulfur | 0.19 |
| Other | |
| Glass Fibers (⅛ inch) | 25.91 |
| Silane | 2.50 |
| Ethanol | n/a |
| Stearic Acid | 0.91 |
| Calcium Stearate | 0.87 |
| Magnesium Oxide | 0.61 |
| Clay | 20.88 |
| Phenolic Novolac plus Hexamethylene tetramine | 36.57 |
| Lime | 0.18 |
| Water | n/a |
| Totals (dry) | 100.00 |

Example 4 (Volume Percent)

| | Formula: I (percent by volume) |
|---|---|
| Carboxylated Acrylic Latex (solids) | 11.74 |
| Sulfur | 0 |
| Other | |
| Glass Fibers (⅛ inch) | 25.88 |
| Silane | 2.49 |
| Ethanol | n/a |
| Stearic Acid | 0.90 |
| Calcium Stearate | 0.87 |
| Magnesium Oxide | 0.61 |
| Clay | 20.85 |
| Phenolic Novolac plus Hexamethylene tetramine | 36.48 |
| Lime | 0.18 |
| Water | n/a |
| Totals (dry) | 100.00 |

Example 5 (Volume Percent)

| | Formula: | |
|---|---|---|
| | J | K |
| | (percent by volume) | |
| Vinyl Pyridine/Butadiene/Styrene Latex (solids) | 11.92 | 0 |
| Carboxylated Styrene/Butadiene Latex (solids) | 0 | 11.51 |
| Sulfur | 0.18 | 0.19 |
| Other | | |
| Glass Fibers (⅛ inch) | 25.76 | 25.88 |
| Silane | 2.48 | 2.49 |
| Ethanol | n/a | n/a |
| Stearic acid | 0.90 | 0.91 |
| Calcium Stearate | 0.86 | 0.87 |
| Magnesium Oxide | 0.61 | 0.61 |
| Clay | 20.76 | 20.86 |
| Phenolic Novolac plus Hexamethylene tetramine | 36.34 | 36.51 |
| Lime | 0.18 | 0.18 |
| Water | n/a | n/a |
| Totals (dry) | 99.99 | 100.01 |

Example 6 (Volume Percent)

| | Formula: | | | |
|---|---|---|---|---|
| | L | M | N | O |
| | (percent by volume) | | | |
| Phenolic Novolac | 30.88 | 0 | 30.90 | 32.56 |
| Phenolic Resole | 0 | 36.72 | 0 | 0 |
| Hexamethylene Tetramine | 5.67 | 0 | 5.67 | 3.96 |
| Magnesium Oxide | 0.61 | 0.61 | 0 | 0.61 |
| Zinc Oxide | 0 | 0 | 0.60 | 0 |
| Powdered Acrylonitrile/Butadiene Copolymer | 11.41 | 11.41 | 11.41 | 11.41 |
| Sulfur | 0.19 | 0.19 | 0.19 | 0.19 |
| Other | | | | |
| Glass Fibers (⅛ inch) | 25.89 | 25.92 | 25.89 | 25.91 |
| Silane | 2.50 | 2.50 | 2.49 | 2.50 |
| Ethanol | n/a | n/a | n/a | n/a |
| Stearic Acid | 0.91 | 0.91 | 0.91 | 0.91 |
| Calcium Stearate | 0.87 | 0.87 | 0.86 | 0.87 |

Example 6 (Volume Percent) -continued

Formula:

| | L | M | N | O |
|---|---|---|---|---|
| | (percent by volume) | | | |
| Clay | 20.86 | 20.88 | 20.87 | 20.88 |
| Lime | 0.21 | 0 | 0.21 | 0.21 |
| Water | n/a | n/a | n/a | n/a |
| Totals (dry) | 100.00 | 100.01 | 100.00 | 100.01 |

Example 7 (Volume Percent)

Formula:

| | P | Q |
|---|---|---|
| | (percent by volume) | |
| Powdered Acrylonitrile/Butadiene copolymer | 11.42 | 11.38 |
| Sulfur | 0.19 | 0 |
| Sulfur as TMTD | 0 | 0.19 |
| TMTD | 0 | 0.48 |
| Other | | |
| Glass Fibers (⅛ Inch) | 25.93 | 25.84 |
| Silane | 2.50 | 2.50 |
| Ethanol | n/a | n/a |
| Stearic Acid | 0.91 | 0.91 |
| Calcium Stearate | 0.87 | 0.87 |
| Magnesium Oxide | 0.61 | 0.61 |
| Clay | 20.84 | 20.81 |
| Phenolic Novolac plus Hexamethylene tetramine | 36.55 | 36.40 |
| Lime | 0.21 | 0.21 |
| Water | n/a | n/a |
| Totals (dry) | 100.03 | 100.01 |

Example 8 (Volume Percent)

Formula:

| | R | S |
|---|---|---|
| | (percent by volume) | |
| Powdered Acrylonitrile/Butadiene copolymer | 11.41 | 11.40 |
| Sulfur as TMTD | (0.20) | (0.20) |
| TMTD | 0.50 | 0.50 |
| Clay | 20.87 | 0 |
| Wollastonite | 0 | 20.86 |
| Other | | |
| Glass Fibers (⅛ Inch) | 25.87 | 25.89 |
| Silane | 2.50 | 2.50 |
| Ethanol | n/a | n/a |
| Stearic Acid | 0.91 | 0.92 |
| Calcium Stearate | 0.91 | 0.90 |
| Magnesium Oxide | 0.63 | 0.61 |
| Phenolic Novolac plus Hexamethylene tetramine | 36.18 | 36.19 |
| Lime | 0.23 | 0.23 |
| Water | n/a | n/a |
| Totals (dry) | 100.01 | 100.00 |

Example 9 (Volume Percent)

Formula:

| | T | U | V | W | X |
|---|---|---|---|---|---|
| | (percent by volume) | | | | |
| Powdered Acrylonitrile/Butadiene Copolymer | 9.15 | 6.90 | 9.10 | 6.87 | 12.91 |
| Sulfur as TMTD | (0.20) | (0.20) | (0.40) | (0.40) | (0.19) |
| TMTD | 0.50 | 0.51 | 1.00 | 1.01 | 0.49 |
| Other | | | | | |
| Glass Fibers (⅛ inch) | 25.99 | 26.11 | 25.86 | 25.98 | 25.87 |
| Silane | 2.51 | 2.52 | 2.49 | 2.50 | 2.52 |
| Ethanol | n/a | n/a | n/a | n/a | n/a |
| Stearic Acid | 0.91 | 0.92 | 0.91 | 0.91 | 0.92 |
| Calcium Stearate | 0.91 | 0.92 | 0.91 | 0.91 | 0.90 |
| Magnesium Oxide | 0.63 | 0.64 | 0.63 | 0.64 | 0.63 |
| Clay | 20.97 | 21.06 | 20.87 | 20.96 | 13.98 |
| Phenolic Novolac plus Hexamethylene tetramine | 38.20 | 40.22 | 38.00 | 40.01 | 41.56 |
| Lime | 0.22 | 0.22 | 0.22 | 0.22 | 0.23 |
| Water | n/a | n/a | n/a | n/a | n/a |
| Totals (dry) | 99.99 | 100.02 | 99.99 | 100.01 | 100.01 |

FIGURES

Referring now to FIG. 1, a logarithmic plot of percent weight loss versus aging time at 270° C. is shown for a variety of phenolic molding formulations from the previously discussed examples. The following table summarizes the results of FIG. 1:

| Curve Number | Material | Time to 10% Weight Loss | Change from Control (hours) | Change from Control (%) |
|---|---|---|---|---|
| 10 | Control "A" (Example 1) | 155 | | |
| 12 | "A" plus 0.19% sulfur | 235 | 80 | 52% |
| 14 | "A" plus 6.35% Acrylonitrile/Butadiene copolymer | 390 | 235 | 152% |
| 16 | "B" of Example 1 (6.35% Acrylonitrile/Butadiene copolymer and 0.19% sulfur) | 800 | 645 | 416% |

FIG. 1 and the above interpretive table graphically point out the beneficial effects of the rubber and sulfur additives on heat aging. While the sulfur alone surprisingly displayed a 52% improvement in retaining valued properties, and the rubber alone displayed a 152% improvement, most unexpectedly, a 416% improvement over the control was exhibited when both were utilized in the same formulation. This synergistic effect (416%) is about twice what one of ordinary skill in the art would expect to find from using both the rubber and the sulfur (i.e., 52% +152% =204%). These surprising and unexpected effects are dramatic in improving heat aging in phenolic molding materials.

Figure 2:
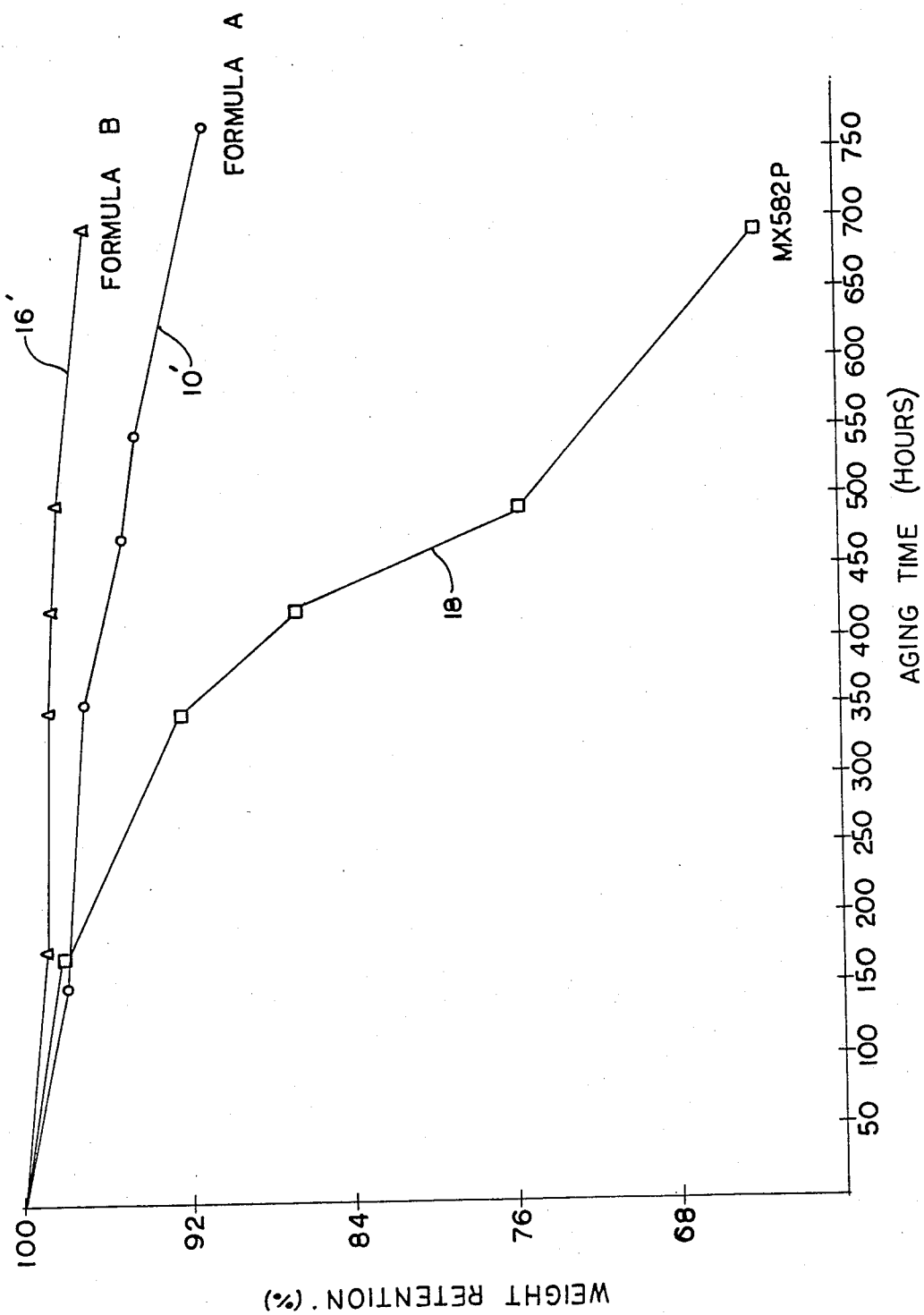
FIG. 2 is a plot of percent weight retention versus aging time for several formulations, one of which is in accordance with the present invention.

Referring to FIGS. 2 and 3, the modified formulation of the present invention corresponding to both curve 16 above and "B" in Example 1 was graphically compared to prior art phenolic molding compounds. In FIG. 2, the curve identified as 18 corresponds to a phenolic molding composition manufactured by Plastics Engineering Company under the tradename MX-582, while the curve 10' corresponds to the control formula (A) as identified in Example 1 and curve 16' corresponds to formula B.

In FIG. 2, a heat aging test for ⅛ inch by 5 inch flex bars at 235° C. is graphically shown in terms of Weight Retained versus Aging Time curves. The results dramatically display the much improved heat stabilizing nature of the present invention as depicted in curve 16 (Formula B). The following table summarizes the results of FIG. 2:

| WEIGHT RETENTION % | | | |
|---|---|---|---|
| Aging Time (hours) | MX582P(18) | Formula A (10') | Formula B (16') |
| 0 | 100(%) | 100 | 100 |
| 144 | | 97.9 | |
| 168 | 98.1 | | 98.7 |
| 336 | 92.1 | | 98.5 |
| 341 | | 96.9 | |
| 408 | 86.4 | | 98.3 |
| 456 | | 95.0 | |
| 480 | 75.4 | | 98.1 |
| 528 | | 94.2 | |
| 672 | 63.8 | | 96.5 |
| 744 | | 90.7 | |

This measure is an excellent way of determining retention of a variety of properties over long periods of time at high temperatures. A 10% weight loss will approximate a 50% loss in flex strength. Thus, while the phenolic composition of the present invention Composition B, curve 16' has retained much of its mechanical properties over the long test period, the other phenolic materials have an enormous decrease in properties relative to the present invention. In another test at 205° C., specimens of formula B retained almost 96% of original weight after 180 days of heat aging.

Referring now to FIG. 3, a graph of flex strength versus time is shown for the same compositions as in FIG. 2. Thus 16", 10" and 18' correspond to Formulas A, B and MX-582P, respectively. Again, the desirable and advantageous properties of the modified Formula B of the present invention having both rubber and sulfur added therein is clearly evident. Notice that over a 180 day period, the Formula B compound retained most of its flexural strength while the control Formula A and the MX-582 compounds had severe flexural strength loss over a far shorter time length.

As discussed previously, we have unexpectedly discovered that the elastomers which improve heat aging are those which embrittle on aging, such as butadiene rubbers, whereas, those that soften on aging (i.e., butyl rubber, natural rubber, acrylate rubbers, polyisoprene, etc.) do not contribute to improved heat aging. One possible theoretical explanation, although we will not limit ourselves to this mechanism, is that rubbers which soften on high temperature oxidative aging do so because of scissioning of the polymeric chains with eventual loss (as volatiles) of low molecular weight segments of the broken polymer chains. This material loss creates void spaces in the phenolic compound which add in their effect to void spaces that form in the degradation of the phenolic resin. The effect of void spaces is not only to structurally weaken the material, but also to provide paths for more rapid oxygen penetration and more surface area for oxygen attack on the resin, thereby accelerating the heat aging process. On the other hand, elastomers that embrittle on aging primarily crosslink due to oxidation, and this hinders the formation of volatile polymeric segments. Indeed, oxygen uptake during the volume of the embrittling elastomer and thereby restrict the passages for air penetration into the phenolic compound containing the dispersed rubber. Example 4 would tend to confirm this proposed theory.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A thermal resistant phenolic molding material consisting essentially of:
   thermosetting phenolic resin;
   aramid fiber reinforcement material;
   rubber compositions which embrittle on heating; and
   at least one sulfur donor compound wherein said sulfur donor compound has an effective weight percent of less than about 1.6 weight percent of the total molding material;
   said phenolic resin being present in a greater weight percent than said rubber compositions; and
   wherein said rubber compositions which embrittle on heating and said sulfur donor compound combine to impart resistance to thermal degradation of said phenolic molding material.

2. The molding material of claim 1 wherein:
   said thermosetting phenolic resin is at least one of the phenolic resins selected form the group comprised of resole with a curing agent, novolac with a curing agent, both resole and novolac with a curing agent or phenol-formaldehyde with a curing agent.

3. The molding material of claim 1 wherein:
   said thermosetting phenolic resin is from 15 to 40 weight percent of the total molding material.

4. The molding material of claim 1 wherein:
   said fiber reinforcement material is in milled form or in chopped strand form.

5. The molding material of claim 1 wherein:
   said fiber reinforcement material is from about 10 to about 40 weight percent of the total molding material.

6. The molding material of claim 1 wherein:
   said rubber composition is a butadiene rubber compound.

7. The molding material of claim 6 wherein:
   said butadiene rubber compound is at least one of the butadiene compounds selected from the group comprised of acrylonitrile/butadiene copolymer latex, powdered acrylonitrile/butadiene copolymer (precross-linked), butadiene/styrene/vinyl pyridine terpolymer latex, butadiene/styrene copolymer latex and carboxyterminated butadiene/styrene copolymer latex.

8. The molding material of claim 1 wherein:
   said rubber composition is at an effective weight percent of the total molding material.

9. The molding material of claim 8 wherein:
   said effective rubber composition is from about 3 to about 8 weight percent of the total molding material.

10. The molding material of claim 1 wherein:
    said sulfur donor compound is at least one of the sulfur donor compounds selected form the group comprised of tetramethylthiuram or 2,2' dithiobisbenzothiazole, morpholine disulfide (Sulfasan R), tetramethylthiuram monosulfide (Unads), dipentamethylenethiuram hexasulfide (Tetrone A).

11. The molding material of claim 1 wherein:
    said sulfur donor compound is from about 0.19 to about 1.6 weight percent of the total molding material.

12. The molding material of claim 1 including additive material selected form the group comprised of fillers, cure accelerators, release agents, pigments and coupling agents.

13. A thermal resistant phenolic molding material consisting essentially of:
    thermosetting phenolic resin;
    aramid fiber reinforcement material;
    rubber compositions which embrittle on heating; and
    at least one sulfur donor compound wherein said sulfur donor compound has an effective volume percent of less than about 2.0 volume percent of the total molding material;
    said phenolic resin being present in a greater volume percent than said rubber compositions; and
    wherein said rubber compositions which embrittle on heating and said sulfur donor compound combine to impart resistance to thermal degradation of said phenolic molding material.

14. The molding material of claim 13 wherein:
    said thermosetting phenolic resin is at least one of the phenolic resins selected from the group comprised of resole, novolac with a curing agent, both resole and novolac with a curing agent or phenol-formaldehyde with a curing agent.

15. The molding material of claim 13 wherein:
    said thermosetting phenolic resin is from about 24 to about 55 volume percent of the total molding material.

16. The molding material of claim 13 wherein:
    said fiber reinforcement material is in milled form or in chopped strand form.

17. The molding material of claim 13 wherein:
    said fiber reinforcement material is from about 8 to about 30 volume percent of the total molding material.

18. The molding material of claim 13 wherein:
    said rubber composition is a butadiene rubber compound.

19. The molding material of claim 18 wherein:
    said butadiene rubber compound is at least one of the butadiene compounds selected from the group comprised of acrylonitrile/butadiene copolymer latex, powdered acrylonitrile/butadiene copolymer (precross-linked), butadiene/styrene/vinyl pyridine terpolymer latex, butadiene/styrene copolymer latex and carboxyterminated butadiene/styrene copolymer latex.

20. The molding material of claim 13 wherein:
    said rubber composition is at an effective volume percent of the total molding material.

21. The molding material of claim 20 wherein:
    said effective rubber composition is from about 5 to about 13 volume percent of the total molding material.

22. The molding material of claim 13 wherein:
    said sulfur donor compound is at least one of the sulfur donor compounds selected from the group comprised of tetramethylthiuram or 2,2' dithiobisbenzothiazole, morpholine disulfide (Sulfasan R), tetramethylthiuram monsulfide (Unads), dipentamethylenethiuram hexasulfide (Tetraon A).

23. The molding material of claim 13 wherein:
    said sulfur donor compound is from about 0.24 to about 2.0 volume percent of the total molding material.

24. The molding material of claim 13 including additive material selected form the group comprised of fillers, cure accelerators, release agents, pigments and coupling agents.

* * * * *